(12) United States Patent
Sahai et al.

(10) Patent No.: US 6,535,163 B1
(45) Date of Patent: Mar. 18, 2003

(54) DETERMINING LOCATION INFORMATION USING SAMPLED DATA CONTAINING LOCATION-DETERMINING SIGNALS AND NOISE

(75) Inventors: Anant Sahai, San Mateo, CA (US); John Tsitsiklis, Lexington, MA (US); Benjamin Van Roy, San Mateo, CA (US); Andrew Chou, San Mateo, CA (US); Wallace Mann, Mill Valley, CA (US); Jesse Robert Stone, Palo Alto, CA (US); Wungkum Fong, Oakland, CA (US)

(73) Assignee: Enuvis, Inc., South San Francisco, CA (US)

( * ) Notice: Subject to any disclaimer, the term of this patent is extended or adjusted under 35 U.S.C. 154(b) by 0 days.

(21) Appl. No.: 09/888,337

(22) Filed: Jun. 22, 2001

(51) Int. Cl.[7] .............................................. H04B 7/185
(52) U.S. Cl. .................................. 342/357.12; 342/457
(58) Field of Search ....................... 342/357.01, 357.06, 342/357.12, 457; 701/213, 215; 455/456, 457

(56) References Cited

U.S. PATENT DOCUMENTS

| | | | | |
|---|---|---|---|---|
| 5,225,842 A | | 7/1993 | Brown et al. ................ | 342/357 |
| 5,327,144 A | * | 7/1994 | Stilp et al. ................... | 342/387 |
| 5,663,734 A | | 9/1997 | Krasner ....................... | 342/357 |
| 5,781,156 A | | 7/1998 | Krasner ....................... | 342/357 |
| 5,874,914 A | | 2/1999 | Krasner ....................... | 342/357 |
| 5,890,068 A | * | 3/1999 | Fattouche et al. ........... | 455/456 |
| 5,920,278 A | * | 7/1999 | Tyler et al. ................... | 342/33 |
| 5,959,944 A | | 9/1999 | Dockes et al. ................ | 369/30 |
| 5,999,124 A | | 12/1999 | Sheynblat ............... | 342/357.09 |
| 6,061,018 A | | 5/2000 | Sheynblat ............... | 342/357.06 |
| 6,131,067 A | | 10/2000 | Girerd et al. ................ | 701/213 |
| 6,133,874 A | | 10/2000 | Krasner .................. | 342/357.15 |
| 6,134,228 A | * | 10/2000 | Cedervall et al. ........... | 370/335 |
| 6,150,980 A | | 11/2000 | Krasner .................... | 342/357.1 |
| 6,185,427 B1 | | 2/2001 | Krasner et al. ............. | 455/456 |
| 6,208,290 B1 | | 3/2001 | Krasner ................. | 342/357.05 |
| 6,215,442 B1 | | 4/2001 | Sheynblat et al. ...... | 342/357.06 |

OTHER PUBLICATIONS

Tsui, James Bao–Yen, "Fundamentals of Global Positioning System Receivers: A Software Approach," Wiley, 2000, pp. 149–150.

Psiaki, Mark L., "Block Acquisition of Weak GPS Signals in a Software Receiver," Cornell University Presented at ION GPS 2001, Sep. 11–14, 2001, Salt Lake City, pp. 1–13.

* cited by examiner

*Primary Examiner*—Dao Phan
(74) *Attorney, Agent, or Firm*—Edward C. Kwok, Esq.

(57) ABSTRACT

To determine the location of a signal receiver, sampled data received from a receiver is divided into data segments of increasing length. Current ranges for a delay value and for a modulation frequency value are calculated relative to each satellite signal source that is overhead the signal receiver. Using the data segments of increasing length, the current ranges, estimates for the delay value and for the modulation frequency value are then iteratively calculated and updated. For each signal source, I and Q correlation integrals and their magnitude values are calculated using the modulation frequency value estimate and each of a range of delay values centered around the delay value estimate. The resulting magnitude-curve is interpolated using the calculated magnitude values. The location of the receiver is calculated using the shape of the magnitude-curve to represent the I and Q correlation integrals for each signal source.

68 Claims, 3 Drawing Sheets

DETERMINING LOCATION INFORMATION USING SAMPLED DATA CONTAINING LOCATION-DETERMINING SIGNALS AND NOISE

FIELD OF THE INVENTION

The present invention relates to signal processing and, more particularly, to techniques for determining the location of a signal receiver.

BACKGROUND OF THE INVENTION

The location of a device may be determined using a global positioning system ("GPS"). In a general GPS system, a receiver acquires signals from four or more satellite vehicles to obtain a three dimensional location and a time stamp. A receiver may employ multiple channels and the received signal in each channel may be used to acquire a signal from a single signal source. After acquisition, a delay-locked loop is traditionally used to track the signal source and is used to give updates to the receiver position through time. GPS satellite vehicles emit two microwave carrier signals of L1 and L2 frequency. The two microwave carrier signals are modulated by: 1) a C/A code (Coarse Acquisition), 2) a P-Code (Precise), and 3) a data message.

The C/A code is a repeating 1 MHz Pseudo Random Noise (PRN) code that modulates the signal at frequency L1. The C/A PRN code comprises 1023 bits of information that is repeated every millisecond. There is a different C/A PRN code for each GPS satellite vehicle. The P-Code modulates the signals at both the L1 and L2 frequencies. The P-Code is a 10 MHz PRN code. The data message modulates the L1-C/A code signal. The data message is a 50 Hz signal consisting of data bits, also known as "navigation bits", that give a time stamp, describe the GPS satellite vehicle orbits, clock corrections, and other parameters. All of this data is useful for the receiver to know in order to calculate and update its position. In traditional GPS systems, this data is decoded from the signal after the signal has been acquired and acquisition is carried out without the benefit of knowing this data.

In one approach, a receiver may attempt to acquire a signal by: 1) generating a replica of the PRN code emitted by a satellite vehicle that is potentially visible overhead the receiver, and 2) determining a correlation between the received signal and a suitable modulated replica code. Typically, the correlation between the received signal and the replica code is performed by calculating the In Phase ("I") and Quadrature ("Q") correlation integrals. One issue that arises is that the signal from the satellite is also modulated by data bits using phase modulation. These data bits are unknown at a standard stand-alone receiver before acquisition and as a result, the I and Q correlation integrals can not be extended coherently beyond the length of one data bit. One existing approach around this problem is to combine the I and Q correlation integrals non-coherently between data bits. This also helps to mitigate the impact of uncertainty in the carrier modulation frequency.

One salient disadvantage to the non-coherent approach is that in instances when the received signal is highly attenuated (for example, if the receiver that is receiving the received signal is in a building), the duration of data needed to compensate for the level of attenuation increases with the level of attenuation at a much faster rate than it does under a coherent approach.

The uncertainty in the carrier modulation frequency arises from two primary sources. The first is the net movement of the individual signal source relative to the receiver. In the case of GPS, the signal source is a satellite moving at a speed of a few thousand meters every second while the receiver may also be moving at a usually slower but usually unknown speed. In the case of GPS, the velocity of the satellite can be calculated to very high accuracy by the receiver once it has access to the current orbital parameters of the satellite in question and the current time. The motion of the signal source and the motion of the receiver introduce a Doppler shift that effectively compresses or dilates the signal in time, resulting in a change in modulation frequency as well. The second major source of frequency uncertainty is the imperfect syntony between the clock on the receiver and the clock in the signal source. Since the signal source clock and the receiver clock are generally distinct, there is a net slowing-down or speeding-up of time between the signal source and the receiver. This clock drift of the receiver relative to the source is also experienced as a compression or dilation of the signal at the receiver and is herein referred to as "clock Doppler."

In addition to the frequency uncertainty, there is an uncertainty introduced due to the unknown propagation delay from the signal source to the receiver. The speed of light is finite and hence it takes a finite time proportional to the distance between the source and the receiver for the signal to arrive at the receiver after being transmitted at the source.

The initial problem of acquiring a signal therefore involves a search over the exact modulation frequency and the delay to the signal source. The pseudorandom structure underlying the signal ensures that the correlation integrals will be relatively small if either the modulation frequency or the delay is substantially different from the true value. Finally, the repeating nature of the PRN code implies that the delay value provides range information only modulo the time of repetition, unless a priori knowledge about the data bits is used.

In traditional positioning systems, the problem of acquisition is solved mostly independently for the different signal sources. Each channel successively tests different delay and frequency hypotheses, and computes I and Q correlations for them. When a sufficiently high value is found, it is tracked for a while and the receiver attempts to decode the data bits. Different channels may be allocated to search for different signal sources, but there is no substantial interaction between the different searches during the acquisition phase. A significant disadvantage of the above approach to acquisition is that it might have to search for a long amount of time before it has acquired enough signals to proceed. The longer the duration of coherent integration, the more finely the modulation frequency has to be known. The more attenuated the signal, the longer the duration of computing the correlations at any given frequency and delay pair must be before the signal can be discriminated from the noise. These two problems combine to make search in attenuated environments prohibitively expensive in terms of either required delays or the number of independent channels needed to acquire the signals. Furthermore, the independence of the channels for each signal in the acquisition phase does not leverage the calculations for the clock Doppler and delay values performed with respect to one signal source to aid the calculations with respect to another signal source.

After acquisition, in traditional GPS, the distance to each satellite is estimated by decoding the time stamp information embedded in the data message and comparing it to the time of reception by the receiver's own clock. The result of this comparison is traditionally referred to as a "pseudorange"

and is expressed in meters rather than seconds by multiplying by the speed of light. Any net drift due to the imperfect synchronization of the two clocks is corrected for through a space/time triangulation procedure combining the pseudoranges from four or more signal sources. This procedure also results in an initial position estimate. This estimate is then updated through time using the outputs of delay locked loops tracking the received signals. This approach suffers from the drawback of having to wait for the time-stamp in the data message before giving even an initial position fix. In traditional GPS, the time stamps are transmitted only once every few seconds. This means that even if the receiver is able to acquire all the satellites instantly, it still might have to wait up to a few seconds before being able to give any position estimate at all.

Some of these difficulties are partially mitigated by the techniques of assisted GPS but many of them remain problematic, especially in challenging attenuated environments such as urban buildings. In such environments, the existing assisted GPS technologies become impractical due to the computation expense and/or the need for very long sampling times.

Based on the foregoing, there is a clear need for a technique to determine the location of the receiver that requires less computational expense and can operate with a shorter duration of data.

SUMMARY OF THE INVENTION

Techniques are provided for determining the location of a signal receiver based on sampled data arising from a received signal that contains location-determining signals and noise. According to one aspect of the invention, segments of sampled data of increasing length are examined in sequence. Bounds for the delay value and bounds for the modulation frequency value of the received signal are calculated for each signal source from a set of signal sources that are presumed detectable at the signal receiver. An estimate ("nominal value") for the delay value, a value range for the delay value, an estimate for the modulation frequency value, and a value range for the modulation frequency value are calculated by iteratively updating the current bounds for the delay value and for the modulation frequency value. The iterative update of the current value range for the delay value and for the modulation frequency value is performed over the set of signal sources and over the segments of data of increasing length. The results obtained from the calculations for one acquired signal source and one segment are used to refine the estimates for another source.

According to another aspect of the invention, a threshold that a calculated correlation magnitude needs to exceed for the signal source to be considered acquired is set according to the widths of the corresponding delay value range and modulation frequency range. This threshold is set by using a statistical method that takes into account the probability that a false acquisition arises within the delay value range and modulation frequency value range. Wide ranges increase the probability of a false acquisition, and therefore raise the acquisition threshold.

According to another aspect of the invention, for each signal source, coherent I and Q correlation integrals are synthesized and their magnitude values are calculated corresponding to various choices for the delay value and for the modulation frequency value, within a search range determined by the current bounds and value ranges. The choices for the delay value and for the modulation frequency are initially made at a coarse scale. In addition, for each signal source that is acquired, I and Q correlation integrals and their magnitude values are calculated corresponding to a set of delay values and modulation frequency values that surround the best current estimate of the delay value and the modulation frequency value. The fine scale shape of the magnitude-curve is estimated using interpolated values corresponding to the estimate of the delay value and the estimate of the modulation frequency value and corresponding to the set of delay values and the set of modulation frequency values that surround the current estimates thereof.

According to another aspect of the invention, the location, time, and other variables of interest related to the receiver are calculated using the shape of the magnitude curve to represent the I and Q correlation integrals for each signal source. Other bounds are calculated to estimate the quality of these estimates and can be used to terminate the algorithm when a sufficiently high quality is reached.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for determining the location of a signal receiver. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
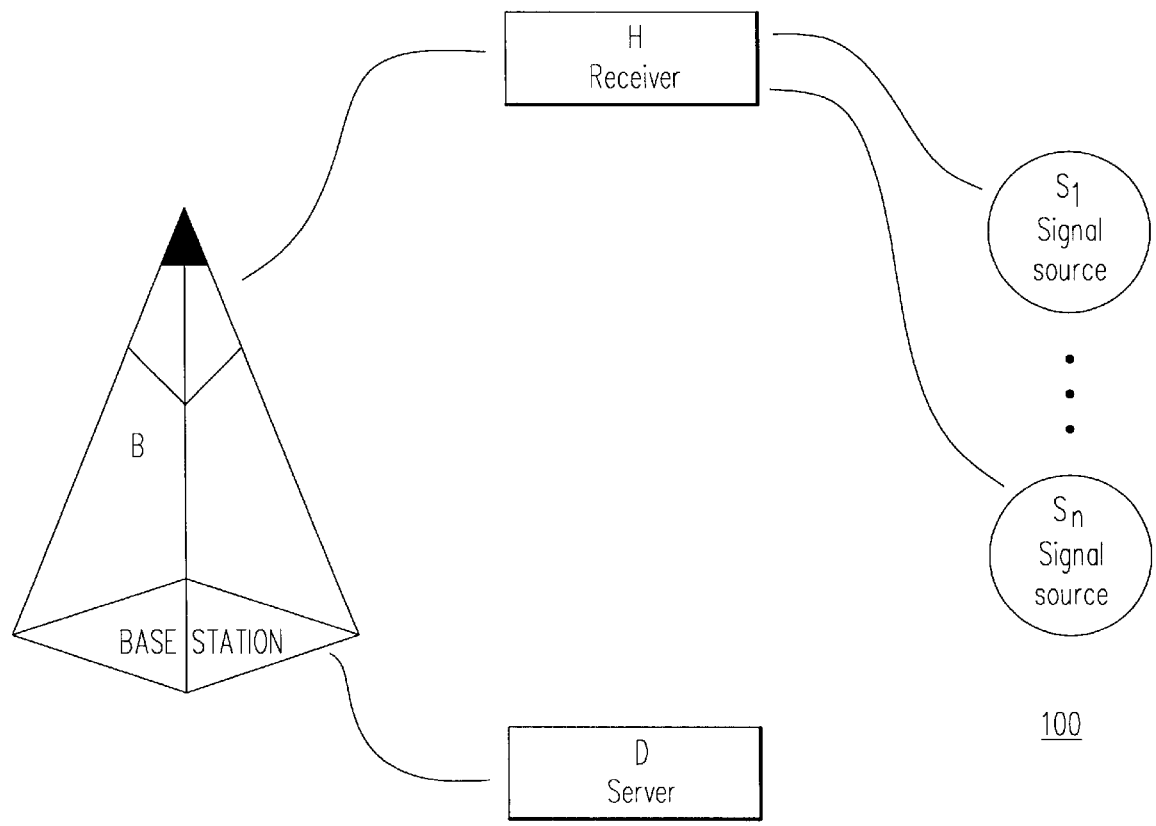
FIG. 1 is a block diagram that illustrates a system overview for determining the location of a receiver.

FIG. 1 is a block diagram that illustrates a system overview for determining the location of a receiver. System 100 comprises a plurality of signal sources of which only signal sources $S_1$ and $S_n$ are shown in FIG. 1. In addition, system 100 comprises a receiver H, a base station B, and a server D.

By way of example, only one base station and one server are shown in system 100. For example, in a practical system, there may be multiple base stations and multiple servers. In other embodiments of the invention, the server may be co-located with the base station or with the receiver.

Examples of signal sources are satellites. Examples of receivers are Global Positioning System receivers, cell phones with embedded signal receivers, Personal Digital Assistants (PDAs) with embedded signal receivers, etc. For the purpose of explanation, the embodiments of the invention are explained with respect to a set of Global Positioning System (GPS) satellite vehicles that is overhead the location of receiver H at any given time. Thus, in the example, of FIG. 1, $S_1$ through $S_n$ represent a plurality of signal sources that make up the set of Global Positioning System (GPS) satellite vehicles that is overhead the location of receiver H at any given time.

By way of example, the GPS satellite vehicles produce analog signals. Each analog signal is received at receiver H.

The signals that are received at H is herein referred to as a "received signal". Thus, the received signal contains, in addition to noise, contributions from all the GPS satellite vehicles that are overhead the receiver. Typically, there is an unknown delay in time from the time the analog signal leaves a particular GPS satellite vehicle and the time that the signal is received at receiver H. Such a delay is herein referred to as a "delay value". In one embodiment of the invention, H converts the analog signal into discrete values as a function of time by digitizing the received signal. The digitized received signal is herein referred to as a "sampled signal" or "sampled data". In one embodiment of the invention, H transmits the sampled data to server D for processing.

Further, by the time the signal transmitted by each of the satellite vehicles overhead reaches the receiver, the signal's original frequency is modulated by an unknown modulation frequency value, also called "carrier frequency", due to a Doppler shift, which may, for example, include a clock Doppler of the satellite vehicle, a clock Doppler of the receiver, and/or the Doppler shift due to relative motion of the receiver with respect to the particular signal source ("relative motion"). If it is assumed that the relative motion of each signal source (satellite vehicles, for example) with respect to receiver H is a known quantity, and that the satellite clock Dopplers are also known, then the clock Doppler of the receiver can be determined by calculating the modulation frequency value corresponding to one of the signals that are present within the received signal.

In certain embodiments, the location of the receiver is determined as described herein with reference to FIGS. 2A and 2B below.

Technique for Determining the Location of a Signal Receiver

A technique for determining the location of a signal receiver according to certain embodiments of the invention is described with reference to FIGS. 2A and 2B.

Figure 2A:
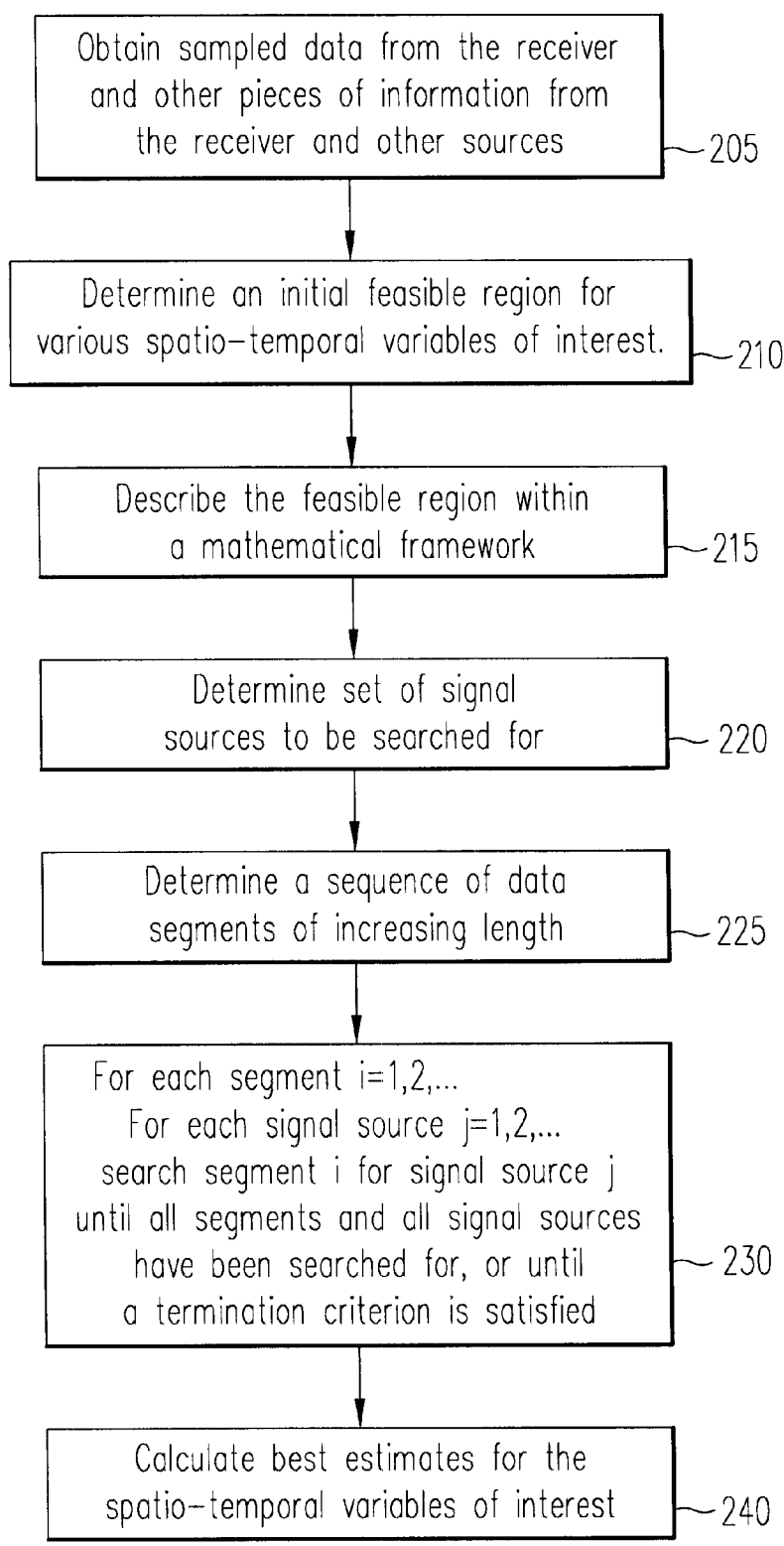
FIGS. 2A and 2B are flowcharts that illustrate an overview of one technique for determining the location of a signal receiver.
Figure 2B:
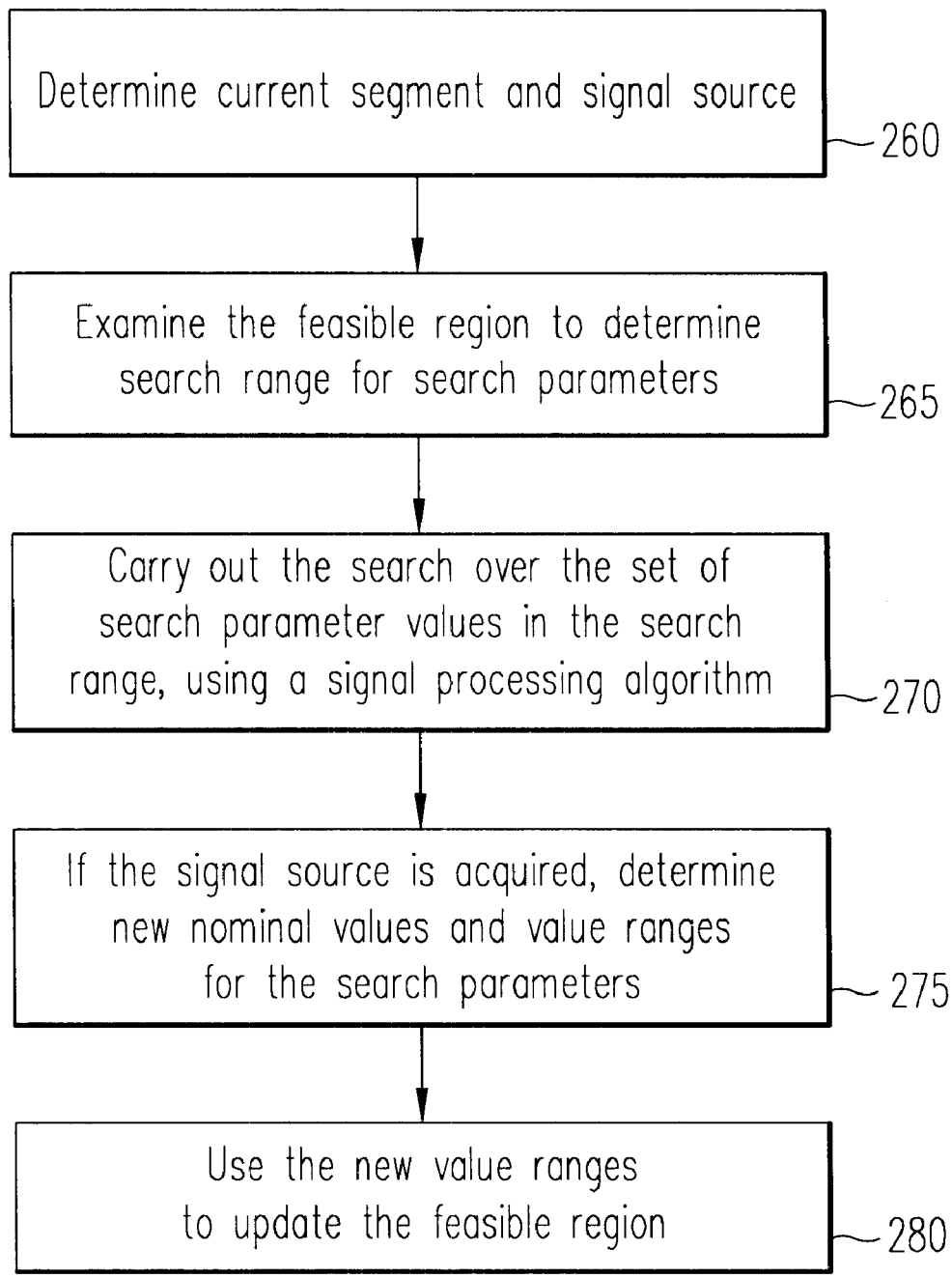

FIGS. 2A and 2B are flowcharts that illustrate an overview of one technique for determining the location of a signal receiver. In certain embodiments of the invention, server D performs the steps as described herein for determining the location of a signal receiver such as receiver H of FIG. 1.

At block 205 the server obtains the sampled data from the receiver. In addition, the server receives several other pieces of information from the receiver and from other sources. In some embodiments, the pieces of information include a timestamp indicating the time as measured by the receiver's clock at which the reception of the received signal was initiated; network information; an approximate location of the receiver; information from differential GPS receivers, such as the navigation bits in the GPS data bit sequences transmitted by the GPS satellites, ephemeris data, satellite clock corrections, and atmospheric corrections; historical records; information on operational details for the specific receiver. In other embodiments, the server creates a pointer to each piece of available information so that any required information can be fetched on demand.

At block 210 the server determines an initial feasible region for various spatio-temporal variables of interest. In some embodiments, the spatio-temporal variables of interest form a vector comprising the three-dimensional position vector corresponding to the location of the receiver in a predetermined coordinate frame, the time at which the reception of the received signal was initiated, the three-dimensional velocity vector corresponding to the velocity of the receiver in a predetermined coordinate frame, and the rate of the receiver clock. A feasible region is a subset of the vector space of all possible vectors of spatio-temporal variables which is presumed to contain the unknown true value of the vector of spatio-temporal variables. An initial feasible region is determined by the information obtained at block 205. One skilled in the art should have no difficulty in using the information obtained by the server to construct the initial feasible region.

At block 215 the feasible region determined at block 210 is described within a mathematical framework, in terms of variables, formulae, and inequalities. In one embodiment, the feasible region is chosen to be a convex polyhedron, where a poly-hedron is a subset of a multidimensional vector space specified in terms of linear inequality constraints.

At block 220 the server determines the set of signal sources to be searched for in the sampled data. In one embodiment, the set of signal sources to be searched for is the set of signal sources that correspond to GPS satellites that are known to lie overhead the receiver.

At block 225 the server determines a sequence of possibly overlapping interval subsets of the sampled data, which are heretofore referred to as "segments," "data segments" or "sampled data segments." In some embodiments, the segments are arranged in a sequence in order of increasing length. In some embodiments, the sequence of segments is constructed so that each segment in the sequence is an extension of the preceding segment. In one embodiment, there is a first segment comprising the first L samples in the sampled data, where L is a predetermined number and, furthermore, the jth segment comprises the first $2^j L$ samples in the sampled data.

In some embodiments, the sequence of segments is constructed on demand by the server as they are needed to be processed. In such embodiments, the data for the segments is only requested from the receiver incrementally. If the processing terminates before all the data is requested, then the receiver saves the cost of having to transport the unneeded data to the server. One skilled in the art will see that techniques of predictive fetching and other methods can be used to increase the performance of such an adaptive system.

The data segments in the sequence of data segments determined at block 225 are processed at block 230, one at a time, in order of increasing length. In one embodiment, the steps represented by block 230 are carried out using the methods described in U.S. patent application Ser. No. 09/888,229, entitled "Determining the Spatio-Temporal and Kinematic Parameters of a Signal Receiver and Its Clock by Information Fusion" by Anant Sahai, Andrew Chou, Wallace Mann and Stefano Casadei, filed on the same day herewith.

While processing a data segment, the signal sources in the set of signal sources determined at block 220 are searched for, one at a time. This search continues until either all segments and sources have been examined or until a termination criterion is satisfied. Possible embodiments of the termination criterion are discussed in detail in section entitled "TERMINATION CRITERIA AND QUALITY ASSESSMENT." Possible embodiments of searching a particular data segment i for a particular signal source j are discussed in detail in reference to FIG. 2B, in section entitled "SEARCHING A DATA SEGMENT FOR A SIGNAL SOURCE."

Finally, at block 240, the server uses the current feasible region and current nominal values for all the search parameters to determine the location of the receiver and other spatio-temporal variables of interest. Possible embodiments for carrying out the process at block 240 are discussed in detail in section entitled "SOLVING FOR THE LOCATION."

Searching a Data Segment For a Signal Source

The process of searching a data segment for a signal source is illustrated in FIG. 2B.

The process starts at block 260 where the index of the current data segment i and of the signal source j to be searched for is determined.

The process at block 265 uses the mathematical representation of the current feasible region to determine a search range for the search parameters. In one embodiment, the search parameters are the delay value and the modulation frequency value for the signal source being searched for. In one embodiment, the search range is taken to be a finite subset of the corresponding value range, which value range can be constructed using the methods discussed in section entitled "REPRESENTING AND QUERYING A FEASIBLE REGION."

The process at block 270 uses a suitable signal processing algorithm to carry out the search for a signal source. In some embodiments, there is a family of possible signal processing algorithms. In some embodiments, a particular signal processing algorithm is selected based on the width of the value range for the search parameters, as discussed in more detail in section entitled "CHOOSING AN APPROPRIATE SIGNAL PROCESSING ALGORITHM." In some embodiments, the signal processing algorithm relies on calculations of I and Q correlation integrals corresponding to a grid of delay values and modulation frequency values within the search range. During the process at block 270, any available results from previous calculations that are needed can be reused rather than be recomputed.

The process at block 270 is said to have acquired the signal source when a calculated correlation magnitude corresponding to calculated I and Q correlation integrals exceeds a threshold. Such a threshold can be possibly set by taking into account the width of the value range for the delay value and the width of the value range for the modulation frequency value, as determined at block 265.

If the search at block 270 for the signal source results in the signal source being acquired, then a process at block 275 determines and saves new nominal values for the search parameters. In one embodiment, the new nominal values are search parameter values that resulted in a largest calculated correlation magnitude over the search range. In addition, the calculated correlation magnitudes are used to determine new value ranges for the search parameters.

The new value ranges determined at block 275 are expressed at block 280 as mathematical constraints on the vector of spatio-temporal variables of interest. These mathematical constraints are added to already existing constraints that define the current feasible region, resulting in a new feasible region.

One skilled in the art can see that many of the steps above might be made implicit in some embodiments of this invention, or be combined with other steps above in a particular embodiment.

Obtaining Information and Determining an Initial Feasible Region

Various embodiments of this invention have access to different amounts and sources of information. Some of this information, such as the timestamp and approximate location of the receiver, enable one to determine the set of signal sources that lie overhead the receiver. One skilled in the art will see that other information like orbital parameters, data messages, and various forms of differential corrections computed using a real or hypothetical reference receiver are also useful for the algorithms in the steps to come.

The timestamp of the receiver, along with some information regarding the clock tolerances of the receiver model, gives a range of possible sampling times for the initial sample. The timestamp and receiver clock tolerances also enable one to calculate a bound on the clock drift of the receiver. One skilled in the art can see that this information can be combined with historical data regarding the particular unit in question to possibly obtain tighter bounds on the uncertainty in either or both variables.

The approximate location of the receiver, along with some information regarding the communication cell structure, provides a three dimensional range of uncertainty in the receiver location. This locational uncertainty might be a sphere, ellipsoid, cylinder, or a polytope like a prism, tetrahedron, or cube for example. Application specific information (such as a range of speed limits in the approximate region) can also be used to generate a similar three dimensional range of uncertainty in receiver velocity. Topographic data and other application specific knowledge can also be used to restrict the range of uncertainty appropriately by restricting the altitude (or a suitable proxy if altitude per se is not one of the basic variables). One skilled in the art can see that this can be combined with historical data regarding the particular unit in question to possibly obtain tighter bounds on the uncertainty in either or both sets of variables.

If the receiver is a part of a cellular communication network, then additional possible information is the angle of arrival at some set of basestations for the signal from the mobile receiver. Combined with a knowledge of the rough geometry of the base-stations, each angle can be associated with a particular sector of space.

One skilled in the art should have no difficulty carrying out this process, for a vast range of potential information sources, expressing the results as regions of uncertainty in the underlying variables, and inferring a feasible region by taking by combining the information obtained from various sources.

Representing and Querying a Feasible Region

In one embodiment the mathematical expression of the feasible region follows the practices in U.S. patent application Ser. No. 09/888,229, entitled "Determining the Spatio-Temporal and Kinematic Parameters of a Signal Receiver and Its Clock by Information Fusion" by Anant Sahai, Andrew Chou, Wallace Mann and Stefano Casadei, filed on the same day herewith. The feasible region is made convex by forming the convex hull of the intersections if necessary of nonconvex sets and by expressing them within an explicit or implicit convex optimization framework. In some embodiments, all regions are polytopes and are represented by a collection of linear inequality constraints. The resulting linear programming framework has the specific advantage of being easy for one in skilled in the art to implement.

Suppose that a feasible region is available and that one is interested in a particular quantity which is a function of the various spatio-temporal parameters. Given that the vector of spatio-temporal parameters must belong to the feasible region, there is an implied range for the possible values for the quantity of interest. This implied range is sometimes referred to as a "value range" The "width" of this value range is defined as the difference between the maximum and the minimum value within the range. In the aforementioned linear programming framework, the value range of any spatio-temporal variable can be determined by solving linear programming problems for which numerous efficient techniques can be found in the literature.

In another embodiment, the feasible region is represented as an intersection of polytopes and ellipsoids. In another embodiment, the feasible region is expressed in terms of constraints that allow the use of semidefinite programming methods to determine the value range of any specific spatio-temporal variable. In yet another embodiment, the feasible region is represented as a polytope with a special structure, such as a parallelepiped.

Determining the Set of Signal Sources to be Searched For

In the GPS context, the set of signal sources to be searched for is defined by determining which satellites can be overhead the receiver during the possible sampling times at which the received signal is received at the receiver, as determined by available bounds on the receiver location and by bounds on the time that the signal reception was initiated by the receiver. In some embodiments, this determination is based on approximate position and timestamp using the techniques described in U.S. patent application Ser. No. 09/782,648, entitled "LOCATION-DETERMINATION METHOD AND APPARATUS" filed by Benjamin Van Roy, John Tsitsiklis and Andrew Chou, on Feb. 12, 2001. In other embodiments, the set of signal sources to be searched for is determined by application specific means.

Choosing an Appropriate Signal Processing Algorithm

In some embodiments, the process at block 270 has a choice between alternative signal processing algorithms, which may include coherent or non-coherent processing techniques. In some embodiments, a single signal processing algorithm is available. In some embodiments, a signal processing algorithm uses the computationally efficient methods for synthesizing coherent correlation sums and for searching for unknown parameters that is described in U.S. patent application Ser. No. 09/888,227, entitled "Synthesizing Coherent Correlation Sums at One or Multiple Carrier Frequencies Using Correlation Sums Calculated at a Coarse Set of Frequencies" by Anant Sahai and John Tsitsiklis, filed on the same day herewith, in combination with the long coherent correlation techniques described in U.S. patent application Ser. No. 09/888,228, entitled "Signal Acquisition Using Data Bit Information" by Anant Sahai, Wallace Mann, Andrew Chou and Benjamin Van Roy, filed on the same day herewith, which takes advantage of the knowledge of the navigation bits that are obtained from a reference receiver, and allows for the efficient calculation of coherent I and Q correlation integrals over a long data segment.

In some embodiments, if the width of the value range for the modulation frequency uncertainty is smaller than a predetermined size, the selected signal processing algorithm is the one described in U.S. patent application Ser. No. 09/888,338, entitled "Extracting Fine-Tuned Estimates from Correlation Functions Evaluated at a Limited Number of Values" by Anant Sahai, John Tsitsiklis, Stefano Casadei, Andrew Chou, Benjamin Van Roy and Jesse Robert Stone, filed on the same day herewith. This algorithm uses calculated I and Q correlation integrals at a coarse grid of modulation frequency values and interpolates them in order to enable a search over a finer grid of modulation frequency values.

When the width of the delay value range is also small, or immediately after a delay value has been identified in this step using another method, an interpolative algorithm from U.S. patent application Ser. No. 09/888,338, entitled "Extracting Fine-Tuned Estimates from Correlation Functions Evaluated at a Limited Number of Values" by Anant Sahai, John Tsitsiklis, Stefano Casadei, Andrew Chou, Benjamin Van Roy and Jesse Robert Stone, filed on the same day herewith, is one embodiment for determining a new nominal value and a new value range for the delay value. In some embodiments, the interpolative algorithm uses calculated I and Q correlation integrals at a coarse grid of delay frequency values and interpolates them in order to enable a search over a finer grid of modulation frequency values. In some embodiments, the coarse grid of delay values is chosen so that the distance between successive delay values in this grid is equal to the time duration between consecutive samples of the received signal.

One skilled in the art will see that there are a great many variations possible in this step based on the details of the application domain, hardware availability, computational costs, etc.

Termination Criteria and Quality Assessment

In general, as more data is processed, the feasible region becomes smaller and the quality of any calculated estimates of spatio-temporal variables improves. The approach in this invention allows one to quantify the quality of the calculated estimates. This is because for any spatio-temporal variable of interest, one can calculate the smallest and largest possible value within the feasible region. The difference between the smallest and largest possible value can be used to quantify the remaining uncertainty.

For example, if one is interested in reducing the two or three-dimensional positioning error until it becomes smaller than some predetermined amount, one can ask for the maximum and minimum acceptable values for the two or three position variables and evaluate the quality of the resulting rectangular prism approximation to the uncertainty region.

If the question at hand is whether the location is verified to be outside some specified forbidden region, then one can form the intersection of the forbidden region with the feasible region. The location will be outside the forbidden region if and only if the intersection is empty. In some embodiments, both the forbidden region and the feasible region are polytopes, in which case the emptiness of their intersection can be determined by using standard linear programming techniques.

One skilled in the art will see that a host of other quality conditions can be expressed in this way with minor variations, and can be used to define termination criteria.

In some embodiments of the invention, the server also gives updated information to the receiver or other device as the computation proceeds. One skilled in the art can see that this updated information can include detailed bounds on the current estimate for position and time, a circle of possible positions, or other depictions of the current state. In some embodiments, a user or other interactive agent can use this information to make a decision about termination of the algorithm and transmit this decision to the server.

Solving for the Location

Once the signal acquisition phase is complete, a final location can be determined by a variety of methods. In one embodiment, one simply considers the current feasible region and calculates a center. In one embodiment, this is accomplished by calculating the minimum and maximum possible values for each spatial variable and taking the average.

In other embodiments, one takes the best nominal values for the search parameters and any other values derived from a template fitting step for each of the signal sources that are considered acquired. These nominal values can be combined using either a classical weighted least squares method technique to give an estimated position and time, where the weights are chosen on the basis of calculated template parameters or on the basis of the relative strengths of the signal sources in the sampled data as deduced from the relative magnitudes of the largest calculated I and Q correlation integral magnitudes.

Alternatively, this weighted least squares method can be cast by one skilled in the art as a quadratic optimization problem to be evaluated over the convex residual feasible region.

In some embodiments, the weighted least squares method used to determine the estimated location and time includes contributions not just from the acquired signals. Additional information brought in can also be used during the solution of the weighted least squares problem. One such piece of information is the time stamp from the receiver. If this time stamp is known to have a certain uncertainty in it, this uncertainty can be used to determine a least squares weight by one skilled in the art. One skilled in the art can also incorporate other such pieces of information into the weighted least squares problem. In some embodiments, an altitude database is queried for the feasible region and is used to determine both a nominal value for the altitude and an uncertainty in that value. This uncertainty can be used to determine a least squares weight by one skilled in the art. One skilled in the art will see that these additional pieces of information can sometimes transform an underdetermined problem into a solvable one. This occurs in some embodiments where time and a three dimensional position are desired but only three or fewer signal sources were acquired. When more than three signal sources are acquired, the use of additional information in the least squares problem can contribute to the accuracy of the result. In some embodiments of this invention, the weights on the information from time stamps, altitude databases, and other sources are purposefully set to be very low. This has the effect of helping prevent underdetermined least squares problems, while still deferring to the information from the acquired signal sources if enough of them are acquired. One skilled in the art will see that a similar goal can be accomplished with respect to signal sources that are acquired but judged to be untrustworthy for some reason. In some embodiments, this occurs when a GPS satellite's signal is acquired but is determined by means of template matching methods to have severe multipath interference. In such cases, the weight associated with untrustworthy signal sources can be set to a very low number as well.

Hardware Overview

An embodiment of the invention may be implemented using a computer system that includes a processor for processing information. The Computer system also includes a main memory, such as a random access memory (RAM) or other dynamic storage device, coupled to a bus for storing information and instructions to be executed by the processor. The main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for storing information and instructions.

The invention is related to the use of the computer system for implementing the techniques described herein. According to one embodiment of the invention, those techniques are implemented by the computer system in response to the processor executing one or more sequences of one or more instructions contained in main memory. Such instructions may be read into the main memory from another computer-readable medium, such as the storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as the storage device. Volatile media includes dynamic memory, such as the main memory. Transmission media includes coaxial cables, copper wire and fiber optics, including the wires that comprise the bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application implements the techniques described herein.

The received code may be executed by the processor as it is received, and/or stored in the storage device, or other non-volatile storage for later execution. In this manner, the computer system may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining a location of a receiver, the method comprising the computer-implemented steps of:
    calculating a current value range for a delay value and a current value range for a modulation frequency value corresponding to each signal source from a set of signal sources that is overhead the receiver;
    calculating an estimate for the delay value and an estimate for the modulation frequency value corresponding to each signal source by using segments of increasing length of a sampled data that is associated with a received signal that is received at the receiver;
    updating the current value range for the delay value and the current value range for the modulation frequency value based on the estimate for the delay value and the estimate for the modulation frequency value;
    determining a current search range for the delay value and a current search range for the modulation frequency value;
    corresponding to each signal source from the set of signal sources, using the sampled data to calculate a set of magnitude calculations of I and Q correlation integrals for:
        a set of delay values from within the current search range for the delay value, wherein the current search range for the delay value includes delay values that surround the estimate of the delay value; and
        a set of modulation frequency values from within the current search range for the modulation frequency value, wherein the current search range for the modulation frequency value includes modulation frequency values that surround the estimate of the modulation frequency value;
    corresponding to each signal source from the set of signal sources, determining interpolated calculations of I and Q correlation integrals by interpolating the calculations of I and Q correlation integrals based on the set of magnitude calculations and a magnitude value corresponding to the estimate of the delay value and the estimate of modulation frequency value; and
    calculating the location of the receiver by using the interpolated calculations of I and Q correlation integrals for each signal source.

2. The method of claim 1, further comprising receiving from the receiver sampled data associated with the received signal.

3. The method of claim 1, wherein calculating a current value range for a delay value corresponding to each signal source is based on:
    an approximate position information that is associated with the receiver relative to an approximate position information that is associated with each signal source; and
    an approximate time information that the receiver received the received signal.

4. The method of claim 1, wherein calculating a current value range for a modulation frequency value corresponding to each signal source is based on:
    a clock correction factor information of the signal source relative to a clock correction factor information of the receiver;
    ephemeris information associated with the signal source;
    navigation bit information associated with the signal source; and
    a type of filter that is used for sampling the received signal to produce the sampled data.

5. The method of claim 1, wherein calculating an estimate for the delay value and an estimate for the modulation frequency value corresponding to each signal source involves using navigation bit information associated with each signal source.

6. The method of claim 1, wherein corresponding to each signal source from the set of signal sources, using the sampled data to calculate a set of magnitude calculations of I and Q correlation integrals for a set of delay values from within the current search range for the delay value and for a set of modulation frequency values within the current search range for the modulation frequency value involves using navigation bit information associated with each signal source.

7. The method of claim 1, wherein corresponding to each signal source from the set of signal sources, interpolating the calculations of the I and Q correlation integrals involves using navigation bit information associated with each signal source.

8. The method of claim 1, wherein corresponding to each signal source from the set of signal sources, interpolating the calculations of I and Q correlation integrals is based on a type of filter that is used for sampling the received signal.

9. The method of claim 1, wherein the increasing lengths of the sampled data is obtained by dividing the sampled data into a set of segments of data, wherein each successive segment of data from the set of segments of data is formed by including all previous segments of data plus additional data from the sampled to reach a pre-determined segment length.

10. The method of claim 9, wherein a pre-determined segment length for a $(j+1)^{th}$ successive segment of data is a number L times 2 to the power of j, wherein j ranges in value from zero to a total number of successive segments and wherein the number L is a positive integer.

11. The method of claim 1, wherein calculating an estimate for the delay value and an estimate for the modulation frequency value corresponding to each signal source by using increasing lengths of the sampled data further comprises the steps of:

Step A: dividing the sampled data into a set of segments of data, wherein each successive segment of data in the set of segments of data is formed by elongating a previous segment of data;

Step B: selecting a shortest segment of data that has not been previously selected from the set of segments of data to be a selected segment of data;

Step C: selecting one signal source that has not been previously selected from a set of signal sources that is overhead the receiver to be a selected signal source;

Step D: estimating the modulation frequency value based on the selected signal source and the selected segment of data by performing the steps of;

Step E: computing the current value range for a delay value and the current value range for a modulation frequency value associated with the received signal if not previously computed based on the selected signal source;

Step F: updating the current value range for the delay value and updating the current value range for the modulation frequency value based on the selected signal source and the selected segment of data if a set of criteria is satisfied, wherein the set of criteria comprises:
  if the current value range for the delay value and current value range for the modulation frequency value are previously computed; and
  if an estimate of the modulation frequency value satisfies a pre-determined tolerance value of modulation frequency value and an estimate of the delay value satisfies a pre-determined tolerance value of the delay value;

Step G: repeating step C through step G until all the signal sources from the set of signal sources have been selected as the selected satellite;

Step H: repeating steps B through H until all segments of data from the set of segments of data have been selected as the selected segment of data.

12. The method of claim 1, wherein the current search range for the delay values comprises discrete delay values, wherein a distance between one delay value from a next delay value equals a time between consecutive samples in the sampled data.

13. The method of claim 1, wherein the current search range for the modulation frequency value is based on a length of each segment that is being processed.

14. A method for determining a location of a receiver, the method comprising the computer-implemented steps of:

receiving from the receiver, sampled data associated with a received signal;

corresponding to each signal source from the set of signal sources that is overhead the receiver, using the sampled data to calculate a set of magnitude calculations of I and Q correlation integrals for a set of delay values from within a current value range for the delay value, wherein the set of delay values include an estimate of the delay value and delay values surrounding the estimate of the delay value;

determining interpolated calculations of I and Q correlation integrals by interpolating the I and Q correlation integrals based on the set of magnitude calculations; and calculating the location of the receiver by using the interpolated calculations of I and Q correlation integrals for each signal source.

15. A method for determining a location of a receiver, the method comprising the computer-implemented steps of:

receiving from the receiver, sampled data associated with a received signal;

calculating a current value range for a delay value and a current value range for a modulation frequency value corresponding to each signal source from a set of signal sources that is overhead the receiver;

calculating an estimate for the delay value and an estimate for the modulation frequency value corresponding to each signal source by performing the steps of:

Step A: dividing the sampled data into a set of segments of data, wherein each successive segment of data in the set of segments of data is formed by elongating a previous segment of data;

Step B: selecting a shortest segment of data that has not been previously selected from the set of segments of data to be a selected segment of data;

Step C: selecting one signal source that has not been previously selected from a set of signal sources that is overhead the receiver to be a selected signal source;

Step D: updating the current value range for the delay value and updating the current value range for the modulation frequency value based on the selected signal source and the selected segment of data if a set of criteria is satisfied, wherein the set of criteria comprises:
  if the current value range for the delay value and the current value range for the modulation frequency value are previously computed; and
  an estimate of the modulation frequency value satisfies a pre-determined tolerance value of modulation frequency value and an estimate of the delay value satisfies a pre-determined tolerance value of the delay value;

Step E: repeating step C through step E until all the signal sources from the set of signal sources have been selected as the selected satellite;

Step F: repeating steps B through F until all segments of data from the set of segments of data have been selected as the selected segment of data;

corresponding to each signal source from the set of signal sources, using the sampled data to calculate a set of magnitude calculations of I and Q correlation integrals for a set of delay values from within the current value range for the delay value, wherein the set of delay values includes delay values that surround the estimate of the delay value;

corresponding to each signal source from the set of signal sources, determining interpolated calculations of I and Q correlation integrals by interpolating the calculations of I and Q correlation integrals based on the set of magnitude calculations and the magnitude value corresponding to the estimate of the delay value; and calculating the location of the receiver by using interpolated calculations of I and Q correlation integrals for each signal source.

16. A computer-readable medium carrying one or more sequences of instructions for determining a location of a receiver, wherein execution of the one or more sequences of instructions by one or more processors causes the one or more processors to perform the steps of:

calculating a current value range for a delay value and a current value range for a modulation frequency value corresponding to each signal source from a set of signal sources that is overhead the receiver;

calculating an estimate for the delay value and an estimate for the modulation frequency value corresponding to each signal source by using segments of increasing length of a sampled data that is associated with a received signal that is received at the receiver;

updating the current value range for the delay value and the current value range for the modulation frequency value based on the estimate for the delay value and the estimate for the modulation frequency value;

determining a current search range for the delay value and a current search range for the modulation frequency value;

corresponding to each signal source from the set of signal sources, using the sampled data to calculate a set of magnitude calculations of I and Q correlation integrals for:
  a set of delay values from within the current search range for the delay value, wherein the current search range for the delay value includes delay values that surround the estimate of the delay value; and
  a set of modulation frequency values from within the current search range for the modulation frequency value, wherein the current search range for the modulation frequency value includes modulation frequency values that surround the estimate of the modulation frequency value;

corresponding to each signal source from the set of signal sources, determining interpolated calculations of I and Q correlation integrals by interpolating the calculations of I and Q correlation integrals based on the set of magnitude calculations and a magnitude value corresponding to the estimate of the delay value and the estimate of modulation frequency value; and calculating the location of the receiver by using the interpolated calculations of I and Q correlation integrals for each signal source.

17. The computer-readable medium of claim 16, further comprising receiving from the receiver sampled data associated with the received signal.

18. The computer-readable medium of claim 16, wherein calculating a current value range for a delay value corresponding to each signal source is based on:

an approximate position information that is associated with the receiver relative to an approximate position information that is associated with each signal source; and an approximate time information that the receiver received the received signal.

19. The computer-readable medium of claim 16, wherein calculating a current value range for a modulation frequency value corresponding to each signal source is based on:

a clock correction factor information of the signal source relative to a clock correction factor information of the receiver;

ephemeris information associated with the signal source;

navigation bit information associated with the signal source; and a type of filter that is used for sampling the received signal to produce the sampled data.

20. The computer-readable medium of claim 16, wherein calculating an estimate for the delay value and an estimate for the modulation frequency value corresponding to each signal source involves using navigation bit information associated with each signal source.

21. The computer-readable medium of claim 16, wherein corresponding to each signal source from the set of signal sources, using the sampled data to calculate a set of magnitude calculations of I and Q correlation integrals for a set of delay values from within the current search range for the delay value and for a set of modulation frequency values within the current search range for the modulation frequency value involves using navigation bit information associated with each signal source.

22. The computer-readable medium of claim 16, wherein corresponding to each signal source from the set of signal sources, interpolating the calculations of the I and Q correlation integrals involves using navigation bit information associated with each signal source.

23. The computer-readable medium of claim 16, wherein corresponding to each signal source from the set of signal sources, interpolating the calculations of I and Q correlation integrals is based on a type of filter that is used for sampling the received signal.

24. The computer-readable medium of claim 16, wherein the increasing lengths of the sampled data is obtained by dividing the sampled data into a set of segments of data, wherein each successive segment of data from the set of segments of data is formed by including all previous segments of data plus additional data from the sampled to reach a pre-determined segment length.

25. The computer-readable medium of claim 24, wherein a pre-determined segment length for a $(j+16)^{th}$ successive segment of data is a number L times 17 to the power of j, wherein j ranges in value from zero to a total number of successive segments and wherein the number L is a positive integer.

26. The computer-readable medium of claim 16, wherein calculating an estimate for the delay value and an estimate for the modulation frequency value corresponding to each signal source by using increasing lengths of the sampled data further comprises the steps of:

Step A: dividing the sampled data into a set of segments of data, wherein each successive segment of data in the set of segments of data is formed by elongating a previous segment of data;

Step B: selecting a shortest segment of data that has not been previously selected from the set of segments of data to be a selected segment of data;

Step C: selecting one signal source that has not been previously selected from a set of signal sources that is overhead the receiver to be a selected signal source;

Step D: estimating the modulation frequency value based on the selected signal source and the selected segment of data by performing the steps of;

Step E: computing the current value range for a delay value and the current value range for a modulation frequency value associated with the received signal if not previously computed based on the selected signal source;

Step F: updating the current value range for the delay value and updating the current value range for the modulation frequency value based on the selected signal source and the selected segment of data if a set of criteria is satisfied, wherein the set of criteria comprises:
 if the current value range for the delay value and current value range for the modulation frequency value are previously computed; and
 if an estimate of the modulation frequency value satisfies a pre-determined tolerance value of modulation frequency value and an estimate of the delay value satisfies a pre-determined tolerance value of the delay value;

Step G: repeating step C through step G until all the signal sources from the set of signal sources have been selected as the selected satellite;

Step H: repeating steps B through H until all segments of data from the set of segments of data have been selected as the selected segment of data.

27. The computer-readable medium of claim 16, wherein the current search range for the delay values comprises discrete delay values, wherein a distance between one delay value from a next delay value equals a time between consecutive samples in the sampled data.

28. The computer-readable medium of claim 16, wherein the current search range for the modulation frequency value is based on a length of each segment that is being processed.

29. A computer-readable medium carrying one or more sequences of instructions for determining a location of a receiver, wherein execution of the one or more sequences of instructions by one or more processors causes the one or more processors to perform the steps of:
 receiving from the receiver, sampled data associated with a received signal;
 corresponding to each signal source from the set of signal sources that is overhead the receiver, using the sampled data to calculate a set of magnitude calculations of I and Q correlation integrals for a set of delay values from within a current value range for the delay value, wherein the set of delay values include an estimate of the delay value and delay values surrounding the estimate of the delay value;
 determining interpolated calculations of I and Q correlation integrals by interpolating the I and Q correlation integrals based on the set of magnitude calculations; and
 calculating the location of the receiver by using the interpolated calculations of I and Q correlation integrals for each signal source.

30. A computer-readable medium carrying one or more sequences of instructions for determining a location of a receiver, wherein execution of the one or more sequences of instructions by one or more processors causes the one or more processors to perform the steps of:
 receiving from the receiver, sampled data associated with a received signal;
 calculating a current value range for a delay value and a current value range for a modulation frequency value corresponding to each signal source from a set of signal sources that is overhead the receiver;
 calculating an estimate for the delay value and an estimate for the modulation frequency value corresponding to each signal source by performing the steps of:
  Step A: dividing the sampled data into a set of segments of data, wherein each successive segment of data in the set of segments of data is formed by elongating a previous segment of data;
  Step B: selecting a shortest segment of data that has not been previously selected from the set of segments of data to be a selected segment of data;
  Step C: selecting one signal source that has not been previously selected from a set of signal sources that is overhead the receiver to be a selected signal source;
  Step D: updating the current value range for the delay value and updating the current value range for the modulation frequency value based on the selected signal source and the selected segment of data if a set of criteria is satisfied, wherein the set of criteria comprises:
   if the current value range for the delay value and the current value range for the modulation frequency value are previously computed; and
   if an estimate of the modulation frequency value satisfies a pre-determined tolerance value of modulation frequency value and an estimate of the delay value satisfies a pre-determined tolerance value of the delay value;
  Step E: repeating step C through step E until all the signal sources from the set of signal sources have been selected as the selected satellite;
  Step F: repeating steps B through F until all segments of data from the set of segments of data have been selected as the selected segment of data;
 corresponding to each signal source from- the set of signal sources, using the sampled data to calculate a set of magnitude calculations of I and Q correlation integrals for a set of delay values from within the current value range for the delay value, wherein the set of delay values includes delay values that surround the estimate of the delay value;
 corresponding to each signal source from the set of signal sources, determining interpolated calculations of I and Q correlation integrals by interpolating the calculations of I and Q correlation integrals based on the set of magnitude calculations and the magnitude value corresponding to the estimate of the delay value; and
 calculating the location of the receiver by using interpolated calculations of I and Q correlation integrals for each signal source.

31. A method for determining spatio-temporal parameters of a receiver, the method comprising the computer-implemented steps of:
 calculating a current value range for a delay value and a current value range for a modulation frequency value corresponding to each signal source from a set of signal sources that are potentially visible by the receiver;
 determining a current search range for the delay value corresponding to each signal source from the set of signal sources, wherein the current search range for the delay value is contained in the current value range for the delay value;
 determining a current search range for the modulation frequency value corresponding to each signal source from the set of signal sources, wherein the current search range for the modulation frequency value is contained in the current value range for the modulation frequency value;

corresponding to each signal source from the set of signal sources, calculating a set of I and Q correlation integrals for a current segment, associated with the current search range for the delay value and the current search range for the modulation frequency value, by using segments of increasing length of data that is associated with a received signal that is received at the receiver, wherein calculating the set of I and Q correlation integrals for the current segment makes use of efficient methods for calculating correlation sums at multiple modulation frequency values;

updating the current value range for the delay value and the current value range for the modulation frequency value, corresponding to each signal source from the set of signal sources, based on a set of magnitude calculations associated with the set of I and Q correlation integrals for the current segment;

updating the current search range for the delay value and the current search range for the modulation frequency value, corresponding to each signal source from the set of signal sources, based on the current value range for the delay value and the current value range for the modulation frequency value corresponding to each signal source from the set of signal sources; and determining the spatio-temporal parameters of the receiver by using interpolated calculations of I and Q correlation integrals for each acquired signal source.

32. The method of claim 31, further comprising receiving from the receiver data associated with the received signal.

33. The method of claim 31, wherein calculating the current value range for the delay value corresponding to each signal source is based on:

an approximate position information that is associated with the receiver relative to an approximate position information that is associated with each signal source;

an approximate time information that the receiver received the received signal;

a clock correction factor information of the signal source relative to a clock correction factor information of the receiver; and ephemeris information associated with the signal source.

34. The method of claim 33, wherein calculating the current value range for the delay value involves a calculation based on a mathematical representation of a feasible region for the spatio-temporal parameters.

35. The method of claim 34 wherein the calculation based on the mathematical representation of the feasible region for the spatio-temporal parameters involves using mathematical programming techniques.

36. The method of claim 35 wherein using mathematical programming techniques, involves using linear programming techniques.

37. The method of claim 31, wherein calculating the current value range for the modulation frequency value corresponding to each signal source is based on:

an approximate position information that is associated with the receiver relative to an approximate position information that is associated with each signal source; and an approximate time information that the receiver received the received signal; and a clock correction factor information of the signal source relative to a clock correction factor information of the receiver; and ephemeris information associated with the signal source; and operational details of the receiver that is used for receiving the received signal.

38. The method of claim 37, wherein calculating the current value range for the modulation frequency value involves a calculation based on a mathematical representation of a feasible region for the spatio-temporal parameters.

39. The method of claim 38 wherein the calculation based on the mathematical representation of the feasible region for the spatio-temporal parameters involves using mathematical programming techniques.

40. The method of claim 39 wherein using mathematical programming techniques, involves using linear programming techniques.

41. The method of claim 31, wherein determining the current search range for the delay value corresponding to each signal source from the set of signal sources involves determining a grid of delay values within the current value range for the delay value corresponding to the signal source.

42. The method of claim 31, wherein determining the current search range for the modulation frequency value corresponding to each signal source from the set of signal sources involves determining a grid of modulation frequency values within the current value range for the modulation frequency value corresponding to the signal source.

43. The method of claim 31 wherein each signal source from the set of signal sources that is potentially visible by the receiver is a GPS satellite.

44. The method of claim 43, wherein corresponding to each signal source from the set of signal sources, calculating the set of I and Q correlation integrals for the current segment involves using navigation bit information associated with each signal source.

45. The method of claim 31, wherein updating the current value range for the delay value, and the current value range for the modulation frequency value, corresponding to each signal source from the set of signal sources, involves a calculation based on a mathematical representation of a feasible region for the spatio-temporal parameters.

46. The method of claim 45 wherein the calculation based on the mathematical representation of the feasible region for the spatio-temporal parameters involves using mathematical programming techniques.

47. The method of claim 46 wherein using mathematical programming techniques, involves using linear programming techniques.

48. The method of claim 31, wherein the segments of increasing length of data is obtained by dividing the data into a set of segments of data, wherein each successive segment of data from the set of segments of data is formed by including all previous segments of data plus additional data from the data to reach a pre-determined segment length.

49. The method of claim 48, wherein the pre-determined segment length for a $(j+1)^{th}$ successive segment of data is a number L times 2 to the power of j, wherein j ranges in value from zero to a total number of successive segments and wherein the number L is a positive integer.

50. The method of claim 31, wherein calculating the set of I and Q correlation integrals for the current segment, associated with the current search range for the delay value and the current search range for the modulation frequency value, comprises the steps of:

Step A: dividing the data into a set of segments of data, wherein each successive segment of data in the set of segments of data is formed by elongating a previous segment of data;

Step B: selecting a shortest segment of data that has not been previously selected from the set of segments of data to be the current segment of data;

Step C: selecting one signal source that has not been previously selected for the current segment of data from the set of signal sources that are potentially visible by the receiver to be a selected signal source;

Step D: calculating the set of I and Q correlation integrals for the current segment of data for every combination of a delay value from within the current search range for the delay value for the selected signal source and a modulation frequency value within the current search range for the modulation frequency value for the selected signal source;

Step E: repeating steps C through step D until all the signal sources from the set of signal sources have been selected as the selected signal source; and Step F: repeating steps B through E until all segments of data from the set of segments of data have been selected as the current segment of data.

51. The method of claim 50, wherein updating the current value range for the delay value and the current value range for the modulation frequency value, corresponding to each signal source from the set of signal sources, comprises the steps of:

Step A: using the set of magnitude calculations associated with the set of I and Q correlation integrals for the current segment of data to determine whether each signal source has been acquired, by comparing the set of magnitude calculations to a threshold;

Step B: updating the current value range for the delay value and the current value range for the modulation frequency value corresponding to each signal source from the set of signal sources that has been acquired, to be intervals surrounding the delay value and modulation frequency value for which the magnitude calculations associated with the set of I and Q correlation integrals are largest; and Step C: updating the current value range for the delay value and the current value range for the modulation frequency value corresponding to each signal source that has not been acquired, by keeping only those values that are compatible with the current value range for the delay value and the current value range for the modulation frequency value associated with the signal sources that have been acquired.

52. The method of claim 31, wherein the data that is associated with a received signal that is received at the receiver are sampled data.

53. The method of claim 52, wherein the current search range for the delay value comprises discrete delay values, wherein a distance from one delay value to a next delay value equals a time between consecutive samples in the sampled data.

54. The method of claim 31, wherein the current search range for the modulation frequency value is based on a length of the current segment that is being processed.

55. The method of claim 31, wherein determining the spatio-temporal parameters of the receiver involves using the interpolated calculations of I and Q correlation integrals for each acquired signal source to determine an estimate of the delay value corresponding to each acquired signal source and then using the estimate of the delay value in a weighted least squares triangulation algorithm.

56. The method of claim 50 wherein calculating I and Q correlation integrals comprises calculating correlation sums that correlate the received signal with a known GPS signal.

57. The method of claim 51 wherein calculating I and Q correlation integrals comprises calculating correlation sums that correlate the received signal with a known GPS signal.

58. The method of claim 55 wherein calculating I and Q correlation integrals comprises calculating correlation sums that correlate the received signal with a known GPS signal.

59. The method of claim 31, wherein the spatio-temporal parameters of the receiver include a position of the receiver and a time at which the received signal is received at the receiver.

60. The method of claim 31, wherein the spatio-temporal parameters of the receiver include a velocity of the receiver.

61. The method of claim 31, wherein the spatio-temporal parameters of the receiver include a clock drift at the receiver.

62. The method of claim 31, wherein the spatio-temporal parameters of the receiver include a position of the receiver, a time at which the received signal is received at the receiver, a velocity of the receiver, and a clock drift at the receiver.

63. A method for determining spatio-temporal parameters of a receiver, the method comprising the computer-implemented steps of:

receiving from the receiver sampled data associated with a received signal;

receiving from the receiver and from other sources information related to a set of potential signal sources and to the receiver spatio-temporal parameters and characteristics;

calculating a current value range for a delay value and a current value range for a modulation frequency value corresponding to each signal source from a set of signal sources that are potentially visible by the receiver;

dividing the sampled data into a set of segments of data, wherein each successive segment of data in the set of segments of data is formed by elongating a previous segment of data;

calculating an estimate for the delay value and an estimate for the modulation frequency value corresponding to each signal source by performing the steps of:

Step A: selecting a shortest segment of data that has not been previously selected from the set of segments of data to be a current segment of data;

Step B: selecting one signal source that has not been previously selected for the current segment of data from the set of signal sources that are potentially visible by the receiver to be a selected signal source;

Step C: determining a current search range for the delay value from within the current value range for the delay value corresponding to the selected signal source;

Step D: determining a current search range for the modulation frequency value from within the current value range for the modulation frequency value corresponding to the selected signal source;

Step E: using the sampled data in the current segment of data to calculate I and correlation integrals corresponding to the selected signal source, for the delay values in the current search range for the delay value and for the modulation frequency values in the current search range for the modulation frequency values, using efficient methods for calculating correlation sums at multiple modulation frequency values;

Step F: calculating a set of magnitude calculations of the I and Q correlation integrals;

Step G: determining that the selected signal source has been acquired if it has been acquired during a previous step, or if the set of magnitude calculations of the I and Q correlation integrals contains a magnitude calculation that exceeds a threshold;

Step H: updating the current value range for the delay value and updating the current value range for the modulation frequency value, corresponding to the selected signal source, based on whether the source has been determined to be acquired and based on interpolated calculations of the I and Q correlation integrals;

Step I: repeating step B through step H until all the signal sources from the set of signal sources have been selected as the selected signal source;

Step J: updating the current value range for the delay value and updating the current value range for the modulation frequency value corresponding to the each signal source, using a linear programming method;

Step K: repeating steps A through I until all segments of data from the set of segments of data have been selected as the current segment of data;

corresponding to each signal source from the set of signal sources that has been determined to be acquired, using the current value range and the available I and Q correlation integrals to determine an estimate of the delay value; and determining the spatio-temporal parameters of the receiver by using the estimate of the delay value corresponding to each signal source that has been determined to be acquired, in a weighted least squares triangulation method.

64. The method of claim 63 wherein the received signal is a GPS signal.

65. The method of claim 63, wherein the spatio-temporal parameters of the receiver include a position of the receiver and a time at which the received signal is received at the receiver.

66. The method of claim 63, wherein the spatio-temporal parameters of the receiver include a velocity of the receiver and a time at which the received signal is received at the receiver.

67. The method of claim 63, wherein the spatio-temporal parameters of the receiver include a clock drift at the receiver.

68. The method of claim 63, wherein the spatio-temporal parameters of the receiver include a position of the receiver, a time at which the received signal is received at the receiver, a velocity of the receiver, and a clock drift at the receiver.

* * * * *